(12) United States Patent
Bauermeister et al.

(10) Patent No.: US 8,230,355 B1
(45) Date of Patent: Jul. 24, 2012

(54) VISUAL REPRESENTATION OF A CHARACTERISTIC OF AN OBJECT IN A SPACE

(75) Inventors: Ben Bauermeister, Seattle, WA (US); Yohko Kelley, Woodinville, WA (US); German Bauer, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1107 days.

(21) Appl. No.: 11/387,183

(22) Filed: Mar. 22, 2006

(51) Int. Cl.
*G06F 3/048* (2006.01)
(52) U.S. Cl. ........................... 715/765; 715/789
(58) Field of Classification Search .................. 715/765, 715/789, 764
See application file for complete search history.

(56) References Cited

U.S. PATENT DOCUMENTS

| | | | |
|---|---|---|---|
| 5,831,617 A * | 11/1998 | Bhukhanwala | 715/839 |
| 6,681,367 B1 * | 1/2004 | Griwodz et al. | 715/234 |
| 7,185,290 B2 | 2/2007 | Cadiz et al. | |
| 2003/0020762 A1 * | 1/2003 | Budrys et al. | 345/835 |
| 2003/0164862 A1 * | 9/2003 | Cadiz et al. | 345/838 |
| 2006/0020899 A1 * | 1/2006 | Gusmorino et al. | 715/765 |
| 2007/0124303 A1 * | 5/2007 | Dettinger et al. | 707/9 |

OTHER PUBLICATIONS

*To remove unused desktop icons*, <http://www.microsoft.com/resources/documentation/window/xp/all/proddocs/en-us/display_desktop_icons_remove.mspx?mfr=true> (visited Aug. 22, 2006).

* cited by examiner

*Primary Examiner* — Chat Do
*Assistant Examiner* — Andrea Leggett
(74) *Attorney, Agent, or Firm* — Robert C. Kowert; Meyertons, Hood, Kivlin, Kowert & Goetzel, P.C.

(57) ABSTRACT

Visual representation of a characteristic of an object in a space is described, including collecting data associated with an object in a space, determining a characteristic of the object based on the data, and visually representing the characteristic of the object relative to other objects within the space using a scaled representation.

14 Claims, 10 Drawing Sheets

VISUAL REPRESENTATION OF A CHARACTERISTIC OF AN OBJECT IN A SPACE

FIELD OF THE INVENTION

The present invention relates generally to software. More specifically, visual representation of a characteristic of an object in a space is described.

BACKGROUND OF THE INVENTION

An object is a data structure that may be stored by a computer system and used by one or more users and/or application programs. An object may be, for example, a file such as a document, still image, video or audio clip; an organizational tool such as a calendar or address book entry, a slideshow, a collection of other objects, etc. Objects may be represented by an icon or other visual indicator that conveys the type of object or the contents of a specific object at a quick glance. Objects may be displayed by various computer programs including operating system desktops and collaboration software.

Objects are often displayed in environments that include several other, similar objects. These objects may include similar content and appearance. A user may need to quickly choose an object from a group of numerous objects. Especially in environments with which the user is not familiar, it may be difficult for the user to quickly differentiate between similar objects. Specifically, it may be difficult for a user to quickly determine those objects in a space sharing a specific characteristic.

Thus, what is needed is a visual representation of a characteristic of an object within a space without the limitations of conventional techniques.

BRIEF DESCRIPTION OF THE DRAWINGS

Various embodiments of the invention are disclosed in the following detailed description and the accompanying drawings.

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

According to various embodiments, techniques for visually representing a characteristic of an object in a space using a scaled representation are disclosed. According to an embodiment, for example, an age or other characteristic of an object relative to other objects in a space may be visually represented by changing the opacity of the object (i.e., "fading-out"), changing the color of an object, shrinking an object, or otherwise visually modifying an object (e.g., adding the appearance of mold to an object). An age of an object can be determined by collecting data associated with an object (e.g., a number of accesses to an object), and by determining how often the object has been accessed within certain time frames (e.g., how many accesses in the last ten days). Values are assigned to each of the accesses, which can be totaled to determine a total point value or age of the object. As an object ages, an aging effect is applied to the object. Other characteristics of the object may be determined and represented in a similar manner.

An Exemplary Space Including Objects

Figure 1:
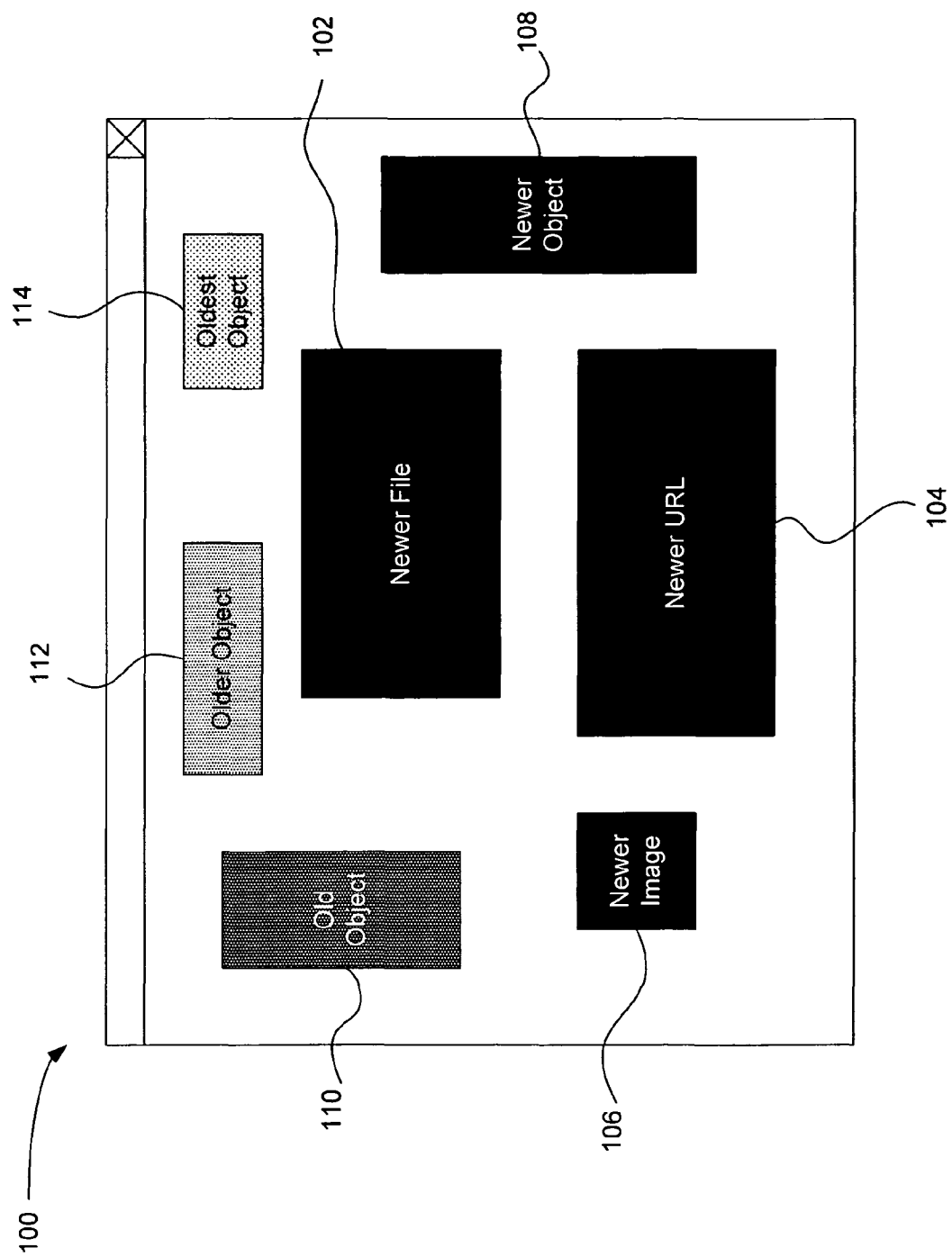
FIG. 1 illustrates an exemplary space in accordance with an embodiment.

FIG. 1 illustrates an exemplary space 100 in accordance with an embodiment. The space 100 may contain one or more objects. A space, according to an embodiment, is a logical construct into which other logical constructs (e.g., objects) may be placed and stored. A space may be, for example, a canvas having specified dimensions (e.g., any size up to and including infinity) which may be manipulated (e.g., zoomed in and out of, panned) to facilitate viewing of objects stored within the space. A space may be a collaborative space used by several users, a desktop, a window in a windowed environment, or any other structure capable of storing and displaying various objects.

An object, according to one embodiment, may be any data structure created by a user, a process, a developer, or the like. For example, a file 102, a uniform resource locator (URL) 104, and an image 106 are types of objects. Other types of objects that can be stored in the space 100 include discussions, calendars, slideshows, videos, sound files, or others.

The file 102, URL 104, image 106, and other objects 108-114 use a visual representation to display their age. As used herein, "age" refers to a characteristic of an object that represents the relative amount of activity an object sees. For example, a "newer" object may be one that is either frequently accessed or has been recently accessed, or is connected to a related object (e.g., a comment about an image) that is frequently accessed or has been recently accessed. Other attributes may be used to determine an age of an object. Here, accessing an object may include modifying, opening, moving, adding a reference to, etc. the object. According to an embodiment, an object may be newer if it is frequently viewed or downloaded, even if it is rarely modified. According to an embodiment, the file 102, URL 104, image 106, and object 108 are newer objects, while the objects 110, 112, and 114 are older objects.

The specific visual representation, or aging effect, used on the objects in the space 100 is a reduction in their opacity as the objects "age" or get older. A visual representation is a visual effect applied to an object to demonstrate a characteristic of the object. When the characteristic demonstrated is the age of the object, the visual representation may be referred to as an aging effect. Additionally, the visual representation may be a scaled representation, in that the visual representation may have a continuously variable effect depending on the relative weight of the characteristic (e.g., the relative age of an object compared to other objects). For example, as an object ages, the appearance of the object changes continuously based on the age of the object. Although an opacity effect is shown in FIG. 1, other types of effects are possible, as is explained regarding FIGS. 4A-4C.

In the forthcoming example, each of the objects in the space 100 would have the same color and shading if they were all the same age. Since some of the objects in the space 100 are older than others, the change in appearance represents the relative age of the objects. For example, the newer objects including the file 102, the URL 104, the image 106, and the object 108 are drawn with 100% opacity, and are therefore opaque and appear normal. Changing the opacity of an object as it ages is a scaled representation. The object 110 is older than the file 102, the URL 104, the image 106, and the object 108, the object 112 is older than the object 110, and the object 114 is the oldest object in the space 100. The level of opacity of the objects 110, 112, and 114 may represent, for example, a certain age of the objects, which in turn represents an amount of activity of that object. For example, the object 108 may be drawn with 100% opacity, while the object 110 may be drawn with 80% opacity, the object 112 may be drawn with 60% opacity, and the object 114 may be drawn with 40% opacity, signifying a steady increase in the age of the objects.

Process for Determining Age of an Object

Figure 2A:
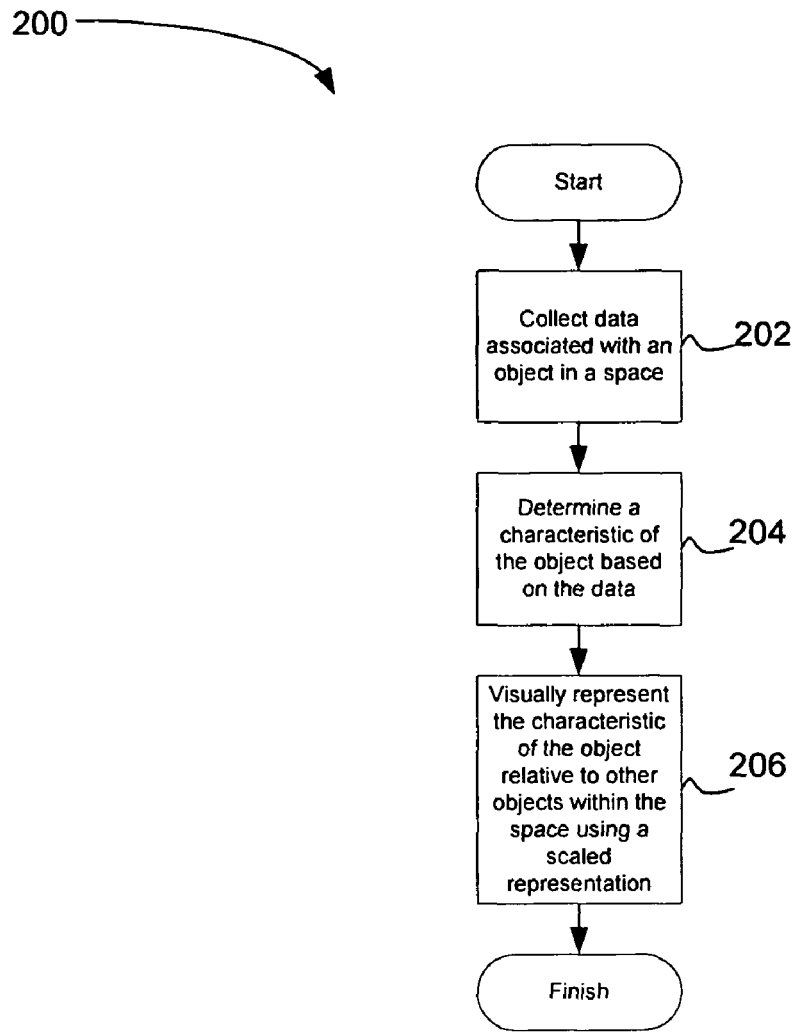
FIG. 2A is a flowchart describing a process for determining a characteristic of an object in a space and drawing the object to visually represent the characteristic of the object according to an embodiment.

FIG. 2A is a flowchart describing a process 200 for determining a characteristic of an object in a space and drawing the object to visually represent the characteristic of the object according to an embodiment. The process 200 describes techniques for accumulating data related to an object and using that data to determine the relative age of the object. The object can then be displayed in the space using a visual representation of the age of the object relative to other objects in the space. In this way, objects may be easily identified. Although an age of an object is described herein, it is understood that other characteristics of an object, such as a size of an object, or a physical location of an object may also be displayed using a visual representation. For example, large objects (e.g., those above a certain threshold size) may have reduced opacity to quickly indicate those objects that may be using a large portion of a system's storage.

In block 202, data associated with an object in a space is collected. The data may include data about a number of times and when an object has been accessed. As used herein, an access to an object may include any time the object is used by any process or user. For example, the associated data may include a number of times and how recently an object was modified, opened, moved, referenced to, downloaded, viewed, etc. Additionally, according to an embodiment, the associated data may include a number of times a related object is accessed. For example, a comment may be an object attached to another, related object (e.g., an image). The number of times the related object (e.g., the comment) is accessed may be included in the number of times the object is accessed. The associated data may be stored as metadata by an operating system of or by other applications such as collaboration software. The associated data may be used by other operations of the process 200 and by other processes that are described herein. The associated data is described below in FIGS. 3A and 3B.

In block 204, a characteristic of the object is determined based on the data collected in block 202. According to an embodiment, determining a characteristic of an object may include determining an age of the object. The characteristic may be represented by drawing the object using a different visual representation compared to other objects in the space. For example, an "old" object may be drawn using 40% opacity, while a "new" object is drawn with 100% opacity. Even though age is described herein, it is understood that other characteristics of the object may be represented using the process 200. The characteristic may be determined using another process. One process, which describes determining an age of an object by assigning a point value to the object based on the collected associated data, is described below in FIG. 2B.

In block 206, the characteristic (determined in block 204) of objects relative to other objects within the space is visually represented using a scaled representation. The scaled representation may be, for example, changing the opacity of the object relative to the other objects in the space, as shown in FIG. 1. Using opacity (and other representations) is scaled since there are various levels of opacity that can be used to draw the object depending on the age of the object. The amount of the effect may be determined using a point value. For example, an older object is less opaque (i.e., more faded). Other types of representations, such as shrinking the object, changing the color of the object, and altering the appearance of the object, are described below in FIGS. 4A-4C.

Figure 2B:
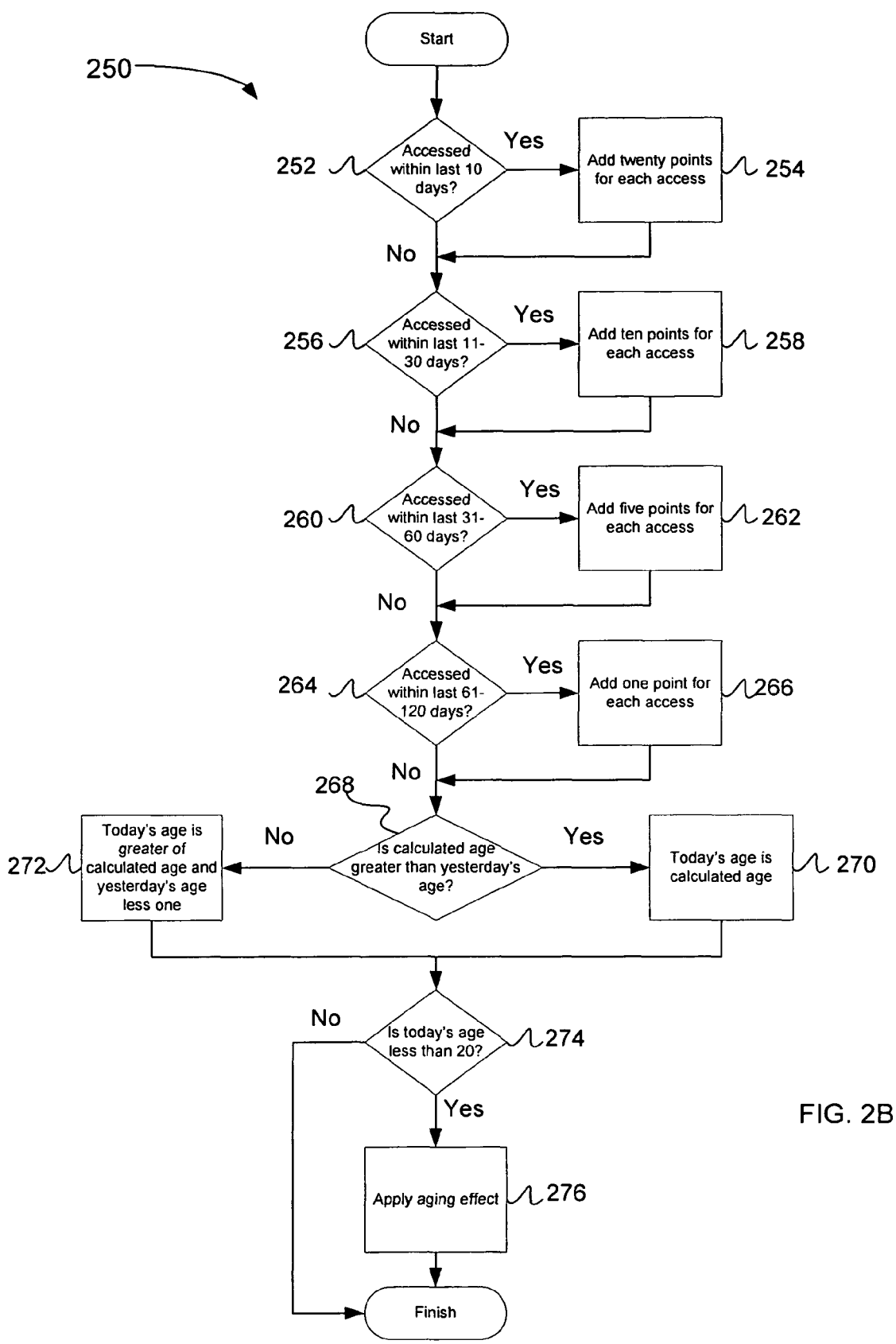
FIG. 2B is a flowchart describing a process for assigning a point value to an object based on the age of the object according to an embodiment.

FIG. 2B is a flowchart describing a process 250 for assigning a point value to an object based on the age of the object according to an embodiment. The process 250 generally describes determining a number of accesses made to an object, assigning a point value to the object based on the number of accesses to the object, and determining a characteristic of the object based on the point value. It is understood that although a specific process is described herein, that the process 250 is exemplary, and that several modifications may be made to the process 250, such as different point values and different time periods, and that other processes may be also be used. According to this specific embodiment, younger objects have a higher point value, while older objects have a lower point value. This may be helpful when calculating the amount of the aging effect to be applied to the object. For example, since older objects have lower opacities, a lower point value for an older object can be used to determine the appropriate opacity for the object.

"Today's age" is the age assigned to the object based on the point value determined using the process 250, and is the age that is used to determine the aging effect for the object. Blocks 252-266 describe determining a calculated age of the object which may not necessarily be today's age assigned to the object through the process 250. Blocks 268-272 describe the process of determining today's age of the object, which is the current age of the object and may be based on the calculated age and yesterday's age of the object, which is the previous age assigned to the object.

In block 252, it is determined whether the object has been accessed within the last ten days. As mentioned above, an object is accessed any time it is used (e.g., any time it is opened, modified, moved, referenced, downloaded, etc.). The process 250 may determine whether an object has been accessed by examining the data associated with the object that was collected in block 202 (and that is explained regarding FIGS. 3A and 3B). If there have been any accesses to the object within the last ten days, twenty points for each access are added to the point value for the object in block 254. If there have been no accesses in the last ten days, the process 250 continues to block 256.

In block 256, it is determined whether the object has been accessed within the last 11-30 days. Again, any hits can be determined by examining the associated data collected in block 202. If the object has been accessed in the last 11-30 days, the process continues to block 258, where ten points are added to the point total for each access in the last 11-30 days. If the object has not been accessed in the last 11-30 days, the process continues to block 260.

In block 260, it is determined whether the object has been accessed in the last 31-60 days. If the object has been accessed in the last 31-60 days, five points are added to the point total for each accessed in block 262. If the object has not been accessed in the last 31-60 days, the process 250 continues to block 264. In block 264, it is determined whether the object has been accessed in the last 61-120 days. If the object has been accessed in the last 61-120 days, the process 250 continues to block 266 where one point is added to the point total for each access. If the object has not been accessed in the last 61-120 days, the process 250 continues to block 268.

In block 268, it is determined whether the calculated age is greater than yesterday's age. If the calculated age is greater than yesterday's age, the process 250 continues to block 270, where today's age is given as the calculated age. If the calculated age is less than yesterday's age, in block 272, today's age is given as the greater of the calculated age and yesterday's age minus one. This procedure can prevent an object from aging too quickly, assuring that the object's age will decrease by at most one point per day.

In block 274, it is determined whether today's age is less than 20. According to an embodiment, the aging effect is displayed when the age of an object is less than 20. If today's age is less than 20, the aging effect is applied in block 276 (a process for visually representing the age of the object is described in FIG. 2C). If today's age is 20 or greater, no aging effect is applied, and the process 250 finishes.

Figure 2C:
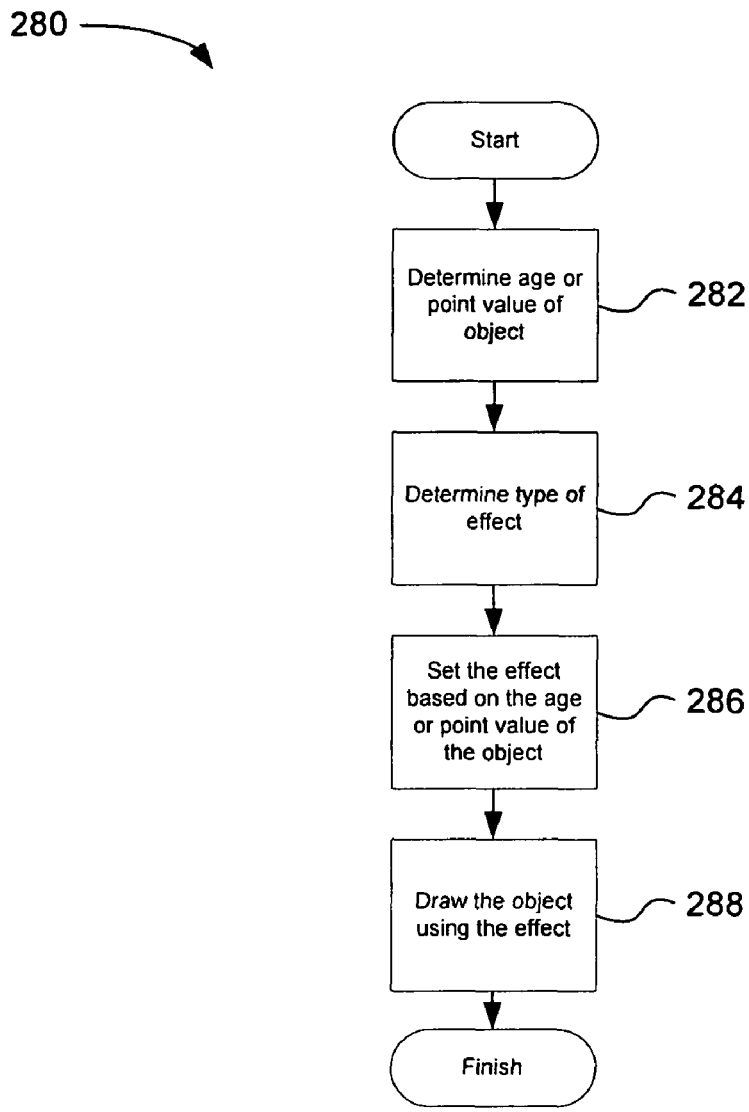
FIG. 2C is a flowchart describing a process for visually representing an age (or other characteristic) of an object using a scaled representation according to an embodiment.

FIG. 2C is a flowchart describing a process 280 for visually representing an age (or other characteristic) of an object using a scaled representation according to an embodiment. Generally, the process 280 described drawing an object according to a scaled representation based on a point value (e.g., the point value used to determine the age of the object). Several different types of aging effects may be applied to an object. For example, as explained below regarding FIGS. 4A-C, various different visual representations including varying opacity (e.g., fade-out), changing colors, shrinking, and adding other visual features such as adding a moldy appearance to the object may be used to distinguish an object based on age.

In block 282, the age or point value assigned to the object is determined. The age or point value can be obtained using the process 250 described above. As mentioned above, a point value may also be assigned to an object based on another characteristic, such as the size or location of the object. In block 284, the type of effect applied to the object is determined. The type of effect, as mentioned above, may be an opacity effect, a color effect, a shrinking effect, or other effect and may be designated by a user or by a routine or application.

In block 286, the effect is set. As used herein, "setting the effect" refers to determining parameters necessary for drawing the object while visually representing the age (or other characteristic) of the object using a scaled representation. For example, the effect may be an opacity effect, shrinking effect, color effect, or modification effect.

In block 288, the object is drawn using the effect. The object may be drawn using any appropriate drawing tool or tools with the effect set above in block 286 applied to the tool or tools. For example, a bitmap that represents the object may be drawn in the space using the aging effect.

In some embodiments, the object may be drawn by the operating system or other routine that manages the objects using a drawing tool such as a bitmap renderer. For example, if the aging effect is an opacity effect, the opacity of the object is determined using the age or the point value. Using the example shown above in the process 250, where the aging effect is only applied to those objects having an age less than 20, the opacity of the object may be determined by multiplying the age of the object by five percent. For example, an object with an age of 19 would have the opacity of the drawing tool set to 95%, while an object with an age of 5 would have the opacity of the drawing tool set to 25%. The object having the age of 19 would look only slightly faded compared to other, newer objects, while the object having the age of 5 would look much more faded. Similarly, if the effect is a color effect (e.g., the object is more yellow as it ages), the effect may be set by multiplying the age by a color value.

Associated Data

Figure 3A:
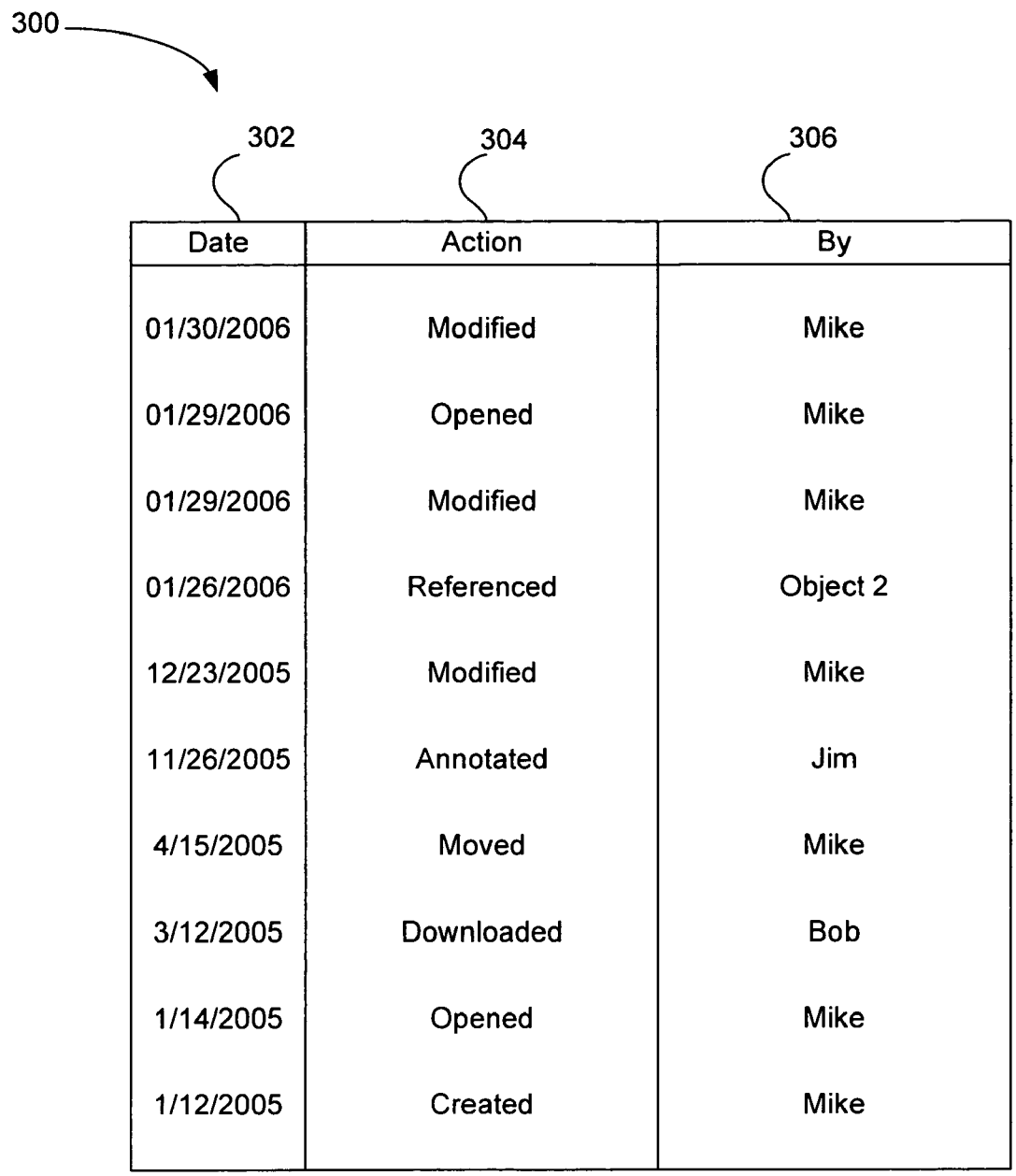
FIG. 3A illustrates associated data attached to an object according to an embodiment.

FIG. 3A illustrates associated data 300 attached to an object according to an embodiment. The associated data 300 is an example of data maintained by a computer routine and may include metadata or other data associated with an object. The associated data 300 can be used with the processes 200 and 250 described above to determine a characteristic, such as an age, of an object in a space. As is shown here, the associated data 300 is for a single object in a space. The associated data 300 may include additional data not shown, such as a location of the object at the time of the access, the size of the object at the time of the access, the number of times a related object is accessed, etc.

The associated data 300 is shown as a table including three columns: a first column 302 showing the date of an access to the object, a second column 304 showing the type of access made to the object (i.e., the action performed), and a third column 306 showing who or what object or process made the access.

The first column 302 and the second column 304 may be used with the process 250 to determine an age of an object. The first column 302 list accesses made to the object by date. If the current date is Feb. 1, 2006, then the object has been accessed four times in the last ten days for eighty points, once in the last 31-60 days for five points, and once in the last 61-120 days for one point. The total age of this object would be 96, and the object would not be subject to an aging effect.

The process 250 may also be modified to use the second column 304 to affect the age of the object. For example, different point values could be assigned to different actions. A user may determine that a modifying a file in the last ten days is worth twenty points, and that opening a file in the last ten days is worth ten points. The process 250 could be further modified by a user and the system to assign different point values for accesses by different users. For example, since the user "Mike" created the object, the process 250 may assign more points for any access that "Mike" makes to the object.

Figure 3B:
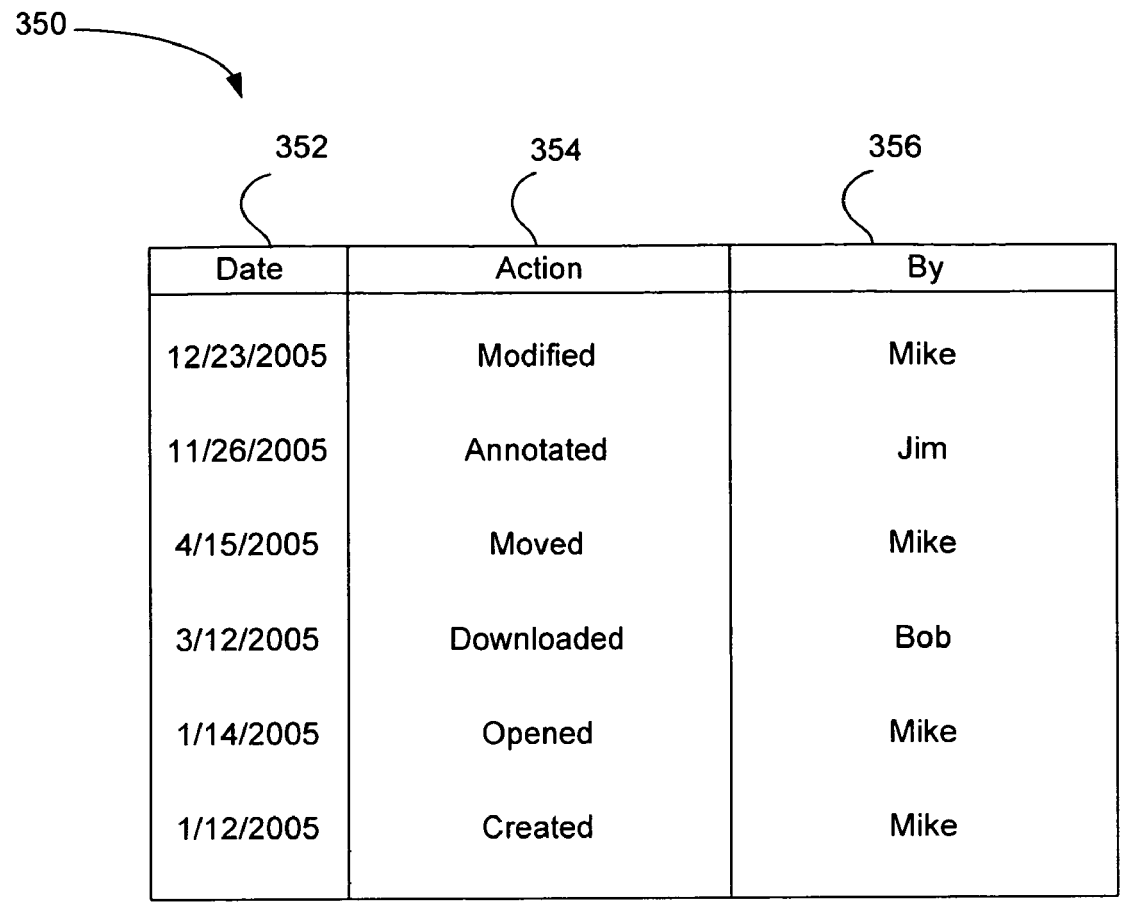
FIG. 3B illustrates associated data attached to an object that may have an aging effect applied according to an embodiment.

FIG. 3B illustrates associated data 350 attached to an object that may have an aging effect applied according to an embodiment. The associated data 350 includes three columns, a first column 352, a second column 354, and a third column 356. As with the associated data 300, the first column 352 shows the date of an access to an object, the second column 354 shows the type of access made to the object, and the third column 356 shows who made the access.

If the age of the object is calculated on Feb. 1, 2006, the object to which the associated data 350 belongs has an age of 6 (five points for the modification made on Dec. 23, 2005 and one point for the annotation made on Nov. 26, 2005). According to an embodiment, the object would have an aging effect applied to it. For example, if the aging effect is an opacity effect, and if the opacity of the object is determined by multiplying 5% opacity by the age of the object, the object would be drawn having 30% opacity.

Visual Representations of Characteristics

Figure 4A:
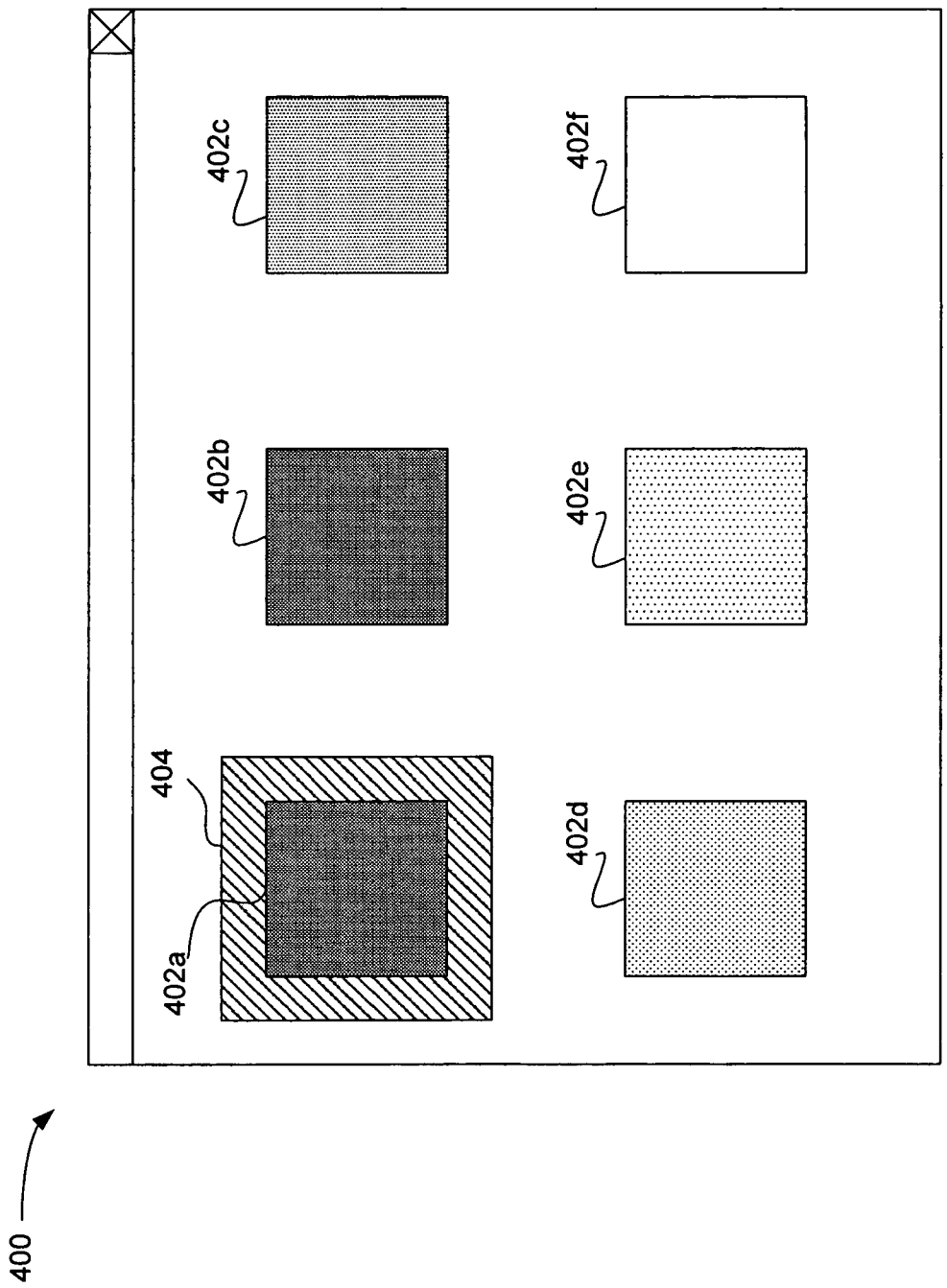
FIG. 4A illustrates an object getting progressively older and exhibiting an opacity or color effect according to an embodiment.
Figure 4B:
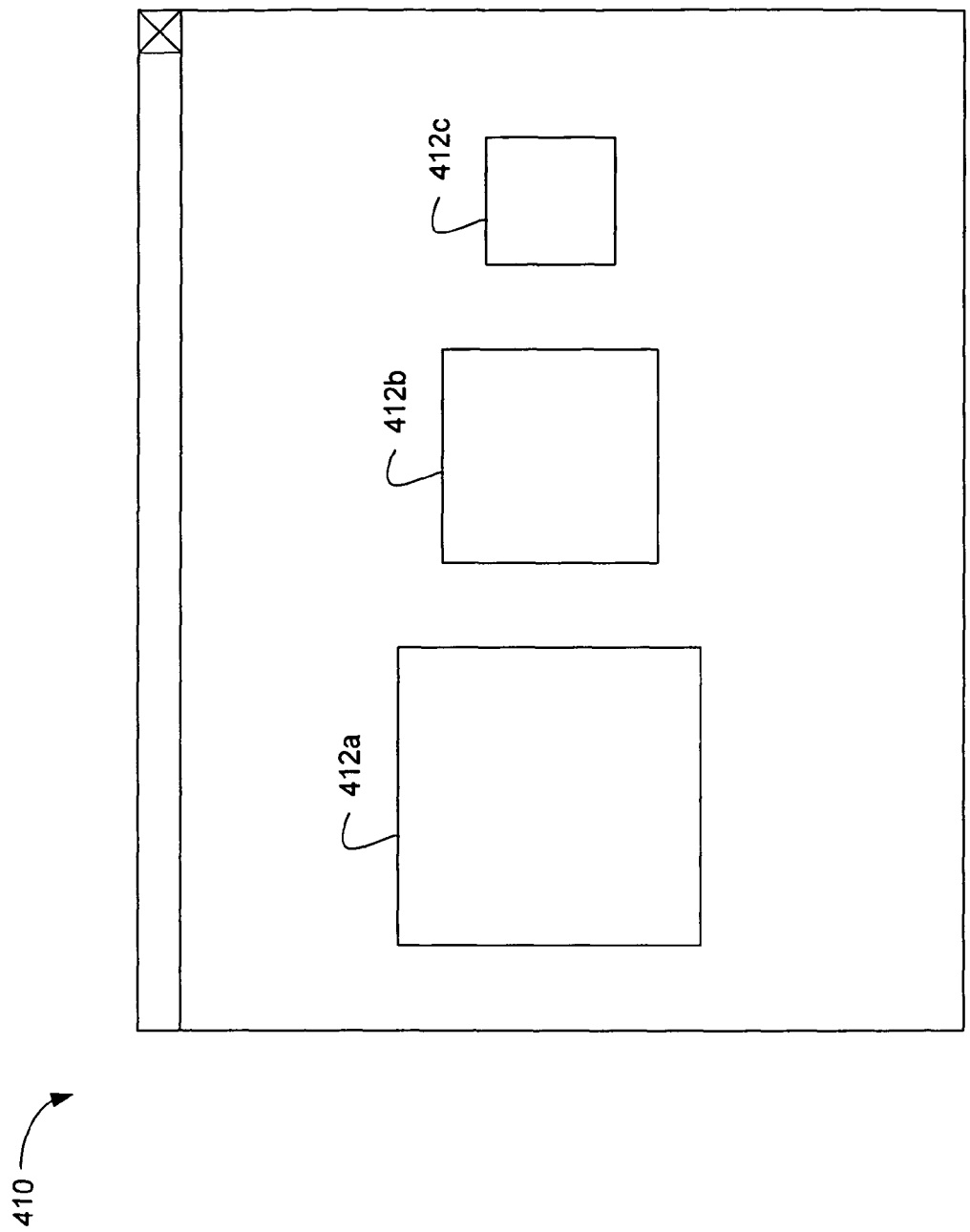
FIG. 4B illustrates an object getting progressively older and exhibiting a shrinking effect according to an embodiment.
Figure 4C:
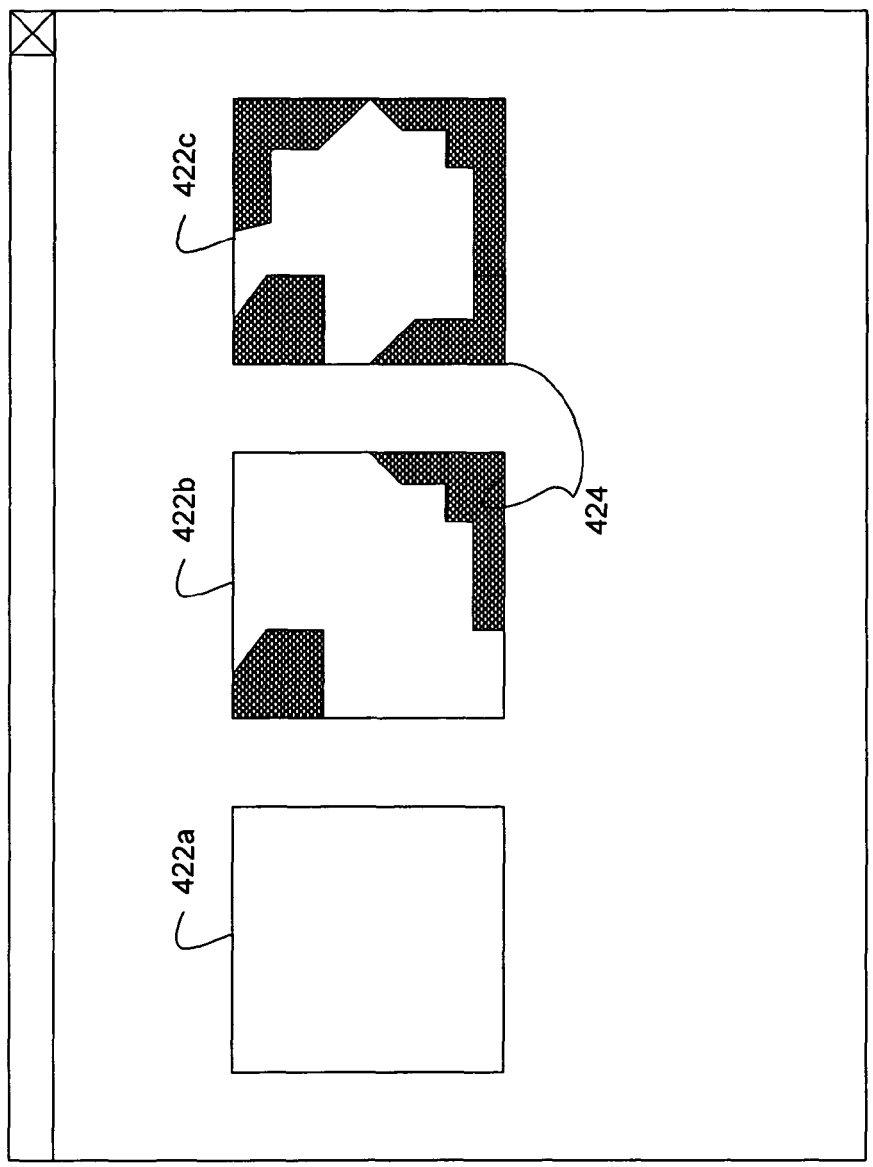
FIG. 4C illustrates an object getting progressively older and exhibiting a modification effect according to an embodiment.

Various characteristics of an object can be visually represented using a scaled representation according to various embodiments. FIGS. 4A-4C illustrate exemplary schemes for visually representing an age or other characteristic of an object in a space. Although age, and specifically an age calculated using a point value determined using the process 250 is described below, it is understood that these visual representations may be used to distinguish any characteristic of an object in a space.

FIG. 4A illustrates an object getting progressively older and exhibiting an opacity or color effect according to an embodiment. An object is shown in several states 402a-402f. The object, when new, is shown as the state 402a, and the object progressively ages when shown as the states 402b, 402c, 402d, 402e, and 402f. The object, when it is new in the state 402a includes, for example, a halo 404 around the object demonstrating that the object is new and has recently been created or placed in a space 400. The opacity of the object is set to 100%; the state 402a of the object is shown fully opaque.

The state 402b of the object still has an age that is 20 or greater, but is no longer new. The state 402b does not show a halo like the halo 404, but the state 402b is still fully opaque. The state 402c has an age less than 20, and therefore is somewhat faded (i.e., the opacity is less than 100%). Each of the subsequent states 402d-402f is older, and therefore less opaque, demonstrating at a quick glance the age of the object. The opacity of the object can be determined using the age and the object may be drawn using the process 280 described above.

The opacity effect demonstrated in FIG. 4A may also be used to demonstrate a changing color effect for the object. For example, as the object progresses through the states 402b-402f, the object may become increasingly yellow to represent a "yellowed" appearance that indicates increasing age. Similarly, the object may include an effect that applies a crumbling paper appearance to the object 402, for example the object may have frayed edges and may be darker at the edges. It is understood that various other visual representations including scaled representations may be used to represent the relative age of the object.

FIG. 4B illustrates an object getting progressively older and exhibiting a shrinking effect according to an embodiment. An object in a space 410 is shown in several different states 412a, 412b, and 412c. The state 412a of the object shows the object when the object is new or when the age of the object is greater than or equal to 20. The object may also include a halo such as the halo 404 to indicate that the object is new.

In the state 412a, the object has an age greater than or equal to 20. The state 412a therefore shows the object at full size (or where the size equals 100%). In the state 412b, the object has an age less than 20; for example, the object has an age of 15. With an age of 15, the object may be displayed having a size of 75% of its original size (for example, the age may be multiplied by 5% to give a percentage of the original size of the object). The state 412c of the object shows the object with an age of 10, for example. The state 412c thus shows the object at roughly half its original size.

FIG. 4C illustrates an object getting progressively older and exhibiting a modification effect according to an embodiment. An object may have an aging effect applied to it that adds the appearance of mold or other visual modifications to the object. According to an embodiment, an object may get "moldier" as it gets older.

An object in a space 420 is shown in several states 422a, 422b, and 422c. The states 422a, 422b, and 422c show the object as it gets progressively older. The first state 422a shows the object when its age is greater than or equal to 20. The first state 422a of the object does not show any mold.

The second state 422b shows the object when it has aged. For example, the second state 422b may show the object when it has an age of 10. A certain amount of mold 424 may be drawn on the object to indicate that the object has aged. The third state 422c shows the object has aged more than in the second state 422b. Additional mold 424 has been added to the object to indicate that the object has aged more than shown in the state 422b.

Although a moldy appearance is shown and described here, it is understood that various other visual representations may be added to the object to indicate age. For example, rust or growing moss may be drawn on the object, increasingly as the object gets older. Additionally, other visual representations, such as a numerical age displayed on a visual representation, or a number of stars indicating the age of the object (e.g., five stars for a "new" object and one star for an old object) may be used.

According to an embodiment, animation or other motion may be used to indicate an age of an object. For example, a new object may move at a higher frequency than an older object.

An Exemplary Computer System

Figure 5:
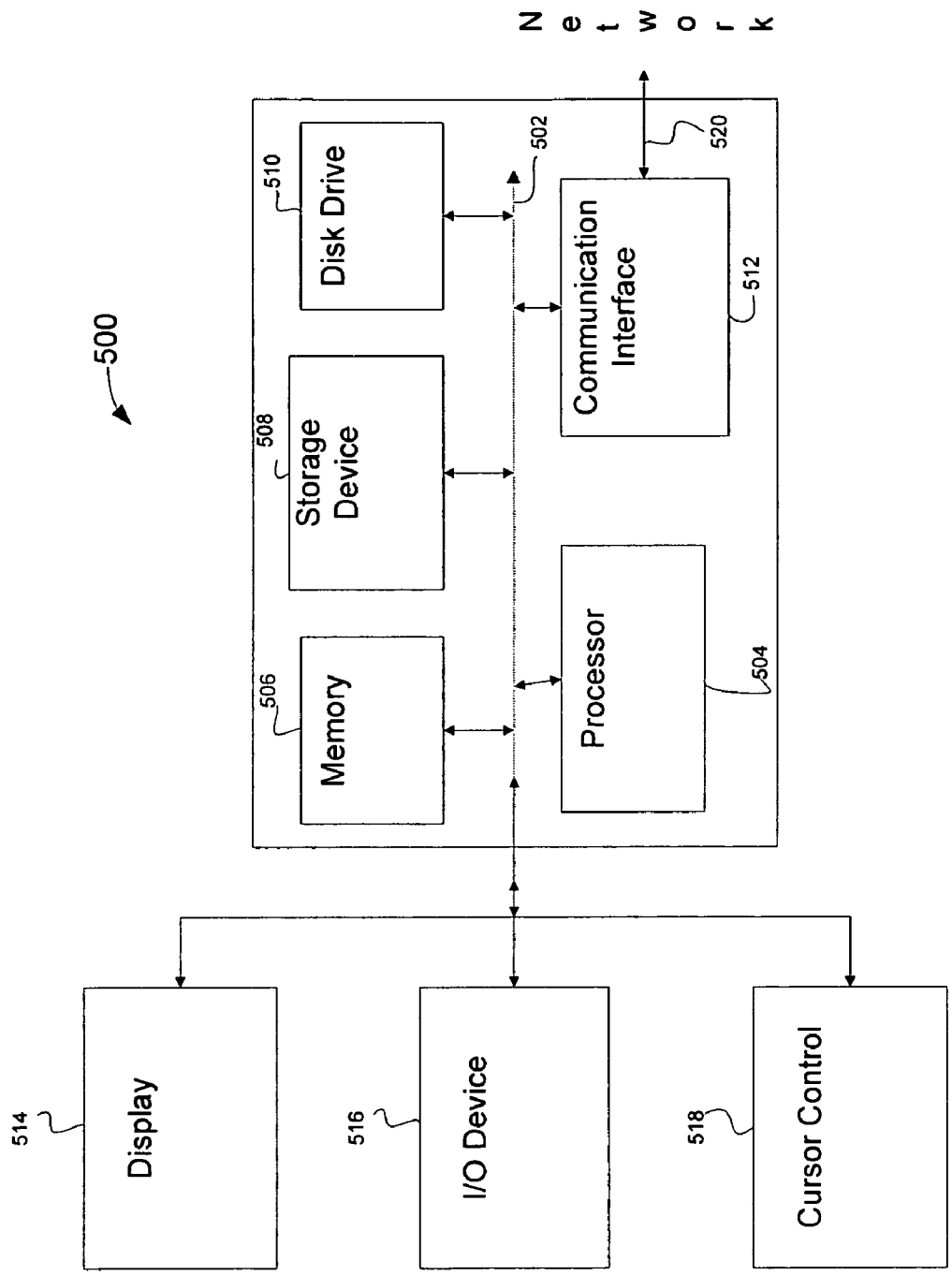
FIG. 5 is a block diagram illustrating an exemplary computer system suitable for visually representing characteristics of an object in a space, in accordance with various embodiments of the invention.

FIG. 5 is a block diagram illustrating an exemplary computer system suitable for visually representing characteristics of an object in a space, in accordance with various embodiments of the invention. In some embodiments, a computer system 500 may be used to implement computer programs, applications, methods, processes, or other software to perform the above-described techniques. The computer system 500 includes a bus 502 or other communication mechanism for communicating information, which interconnects subsystems and devices, such as a processor 504, a system memory 506 (e.g., RAM), a storage device 508 (e.g., ROM), a disk drive 510 (e.g., magnetic or optical), a communication interface 512 (e.g., modem or Ethernet card), a display 514 (e.g., CRT or LCD), an input device 516 (e.g., keyboard), and a cursor control 518 (e.g., mouse or trackball).

According to some embodiments of the invention, the computer system 500 performs specific operations by processor 504 executing one or more sequences of one or more instructions stored in the system memory 506. Such instructions may be read into the system memory 506 from another computer readable medium, such as the static storage device 508 or the disk drive 510. In some embodiments, hard-wired circuitry may be used in place of or in combination with software instructions to implement the invention.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A method, comprising:
    performing, by a computer:
        accessing data pertaining to a plurality of objects displayed in a space;
        measuring an age related characteristic for each of the plurality of objects based on the data, wherein said measuring comprises:
            determining a number of accesses to each object,
            assigning a point value to each object based on the number of accesses to the object and times of access, and
            determining the age related characteristic based on the point value;
        applying a variable visual effect relative to each other object to the display of each of one or more of the plurality of objects, wherein the respective visual effect applied to the display of each object varies for that object dependent on the age related characteristic of the respective object; and
        wherein said accessing, said measuring and said applying are automatically repeated over time to visually indicate actual changes over time in the age related characteristics for each of the one or more of the plurality of objects, and wherein the actual changes over time are visually indicated by the variable visual effect applied to the display of each object.

2. The method of claim 1, wherein measuring the age related characteristic for each object further comprises determining an age of the object.

3. The method of claim 1, wherein the visual effect comprises:
    an opacity effect.

4. The method of claim 1, wherein the visual effect comprises:
    a shrinking effect.

5. The method of claim 1, wherein the visual effect comprises:
    a color effect.

6. The method of claim 1, wherein determining the number of accesses to each object comprises determining at least one of a number of times one or more of the plurality of objects has been opened, modified, or referenced.

7. A method, comprising:
    performing by a computer:
        accessing data for a plurality of objects displayed in a space, wherein the data indicates a number of times each object has been accessed;
        measuring an age related characteristic for each of the plurality of objects based on the data, wherein said measuring includes:
            determining a point value based on the number of times each respective object has been accessed and times of the accesses; and
            determining the age related characteristic based on the point value;
        applying a variable visual effect relative to each other object to the display of one or more of the plurality of objects, and wherein the respective visual effect applied to the display of each object varies for the object dependent on the age related characteristic of the respective object; and
        wherein said accessing, said measuring and said applying are automatically repeated over time to visually indicate actual changes over time in the age related characteristics for each of the one or more of the plurality of objects, and wherein the actual changes over time are visually indicated by the variable visual effect applied to the display of each object.

8. The method of claim 7, wherein the visual effect is chosen from the group consisting of an opacity effect, a color effect, a shrinking effect, and a modification effect.

9. A system, comprising:
    a processor; and
    a memory storing data associated with a plurality of objects displayed in a space, and storing program instructions executable by the processor to:
        access said data;
        measure an age related characteristic for one or more of the plurality of objects based on the data, wherein to perform said measuring, the program instructions are further executable by the processor to:
            determine a number of accesses to each object,
            assign a point value to the object based on the number of accesses to the object and times of access, and
            determine the age related characteristic based on the point value;
        apply a variable visual effect relative to each other object to the display of each of the one or more of the plurality of objects, wherein the respective visual effect applied to the display of each object varies for the object dependent on the age related characteristic of the respective object; and
        wherein said accessing, said measuring and said applying are automatically repeated over time to visually indicate actual changes over time in the age related characteristics for each of the one or more of the plurality of objects, and wherein the actual changes over time are visually indicated by the variable visual effect applied to the display of each object.

10. The system of claim 9, wherein the age related characteristic of the object comprises an age of the object.

11. The system of claim 9, wherein the visual effect is at least one of an opacity effect, a color effect, a shrinking effect, or a modification effect.

12. A computer readable storage medium storing computer instructions executable by a processor to implement:
    accessing data for a plurality of objects displayed;
    measuring an age related characteristic for one or more of the plurality of objects based on the data, wherein said measuring includes:
        determining a number of accesses to the object,
        assigning a point value to the object based on the number of accesses to the object and times of access, and determining the age related characteristic based on the point value;

applying a variable visual effect relative to each other object to the display of each of the one or more of the plurality of objects, wherein the respective visual effect applied to the display of each object varies for the object dependent on the age related characteristic of the object; and wherein said accessing, said measuring and said applying are automatically repeated over time to visually indicate actual changes over time in the age related characteristics for each of the one or more of the plurality of objects, and wherein the actual changes over time are visually indicated by the variable visual effect applied to the display of each object.

13. The computer readable storage medium of claim 12, wherein measuring the age related characteristic for one or more of the plurality of objects comprises determining an age of the object.

14. The computer readable storage medium of claim 12, wherein the visual effect is at least one of an opacity effect, a color effect, a shrinking effect, or a modification effect.

* * * * *